(12) United States Patent
Rousseau et al.

(10) Patent No.: US 8,510,088 B2
(45) Date of Patent: Aug. 13, 2013

(54) FLEXIBLE EVALUATOR FOR VEHICLE PROPULSION SYSTEMS

(75) Inventors: Aymeric Rousseau, Chicago, IL (US); Phillip B. Sharer, Plainfield, IL (US); Sylvain Pagerit, Westmont, IL (US)

(73) Assignee: UChicago Argonne LLC, Chicago, IL (US)

( * ) Notice: Subject to any disclaimer, the term of this patent is extended or adjusted under 35 U.S.C. 154(b) by 622 days.

(21) Appl. No.: 12/562,866

(22) Filed: Sep. 18, 2009

(65) Prior Publication Data

US 2010/0082303 A1 Apr. 1, 2010

Related U.S. Application Data

(60) Provisional application No. 61/101,511, filed on Sep. 30, 2008.

(51) Int. Cl.
| G06G 7/48 | (2006.01) |
| G06F 17/50 | (2006.01) |
| G06F 19/00 | (2011.01) |
| G06T 15/00 | (2006.01) |
| G06T 17/00 | (2006.01) |

(52) U.S. Cl.
USPC ........ 703/8; 703/7; 703/1; 345/419; 345/420; 700/97; 700/98

(58) Field of Classification Search
USPC ............................................................ 703/8
See application file for complete search history.

(56) References Cited

U.S. PATENT DOCUMENTS

| 4,196,528 A * | 4/1980 | Foerst ............................. 434/61 |
| 4,965,743 A * | 10/1990 | Malin et al. ..................... 706/45 |
| 5,732,192 A * | 3/1998 | Malin et al. ..................... 703/2 |
| 5,825,651 A * | 10/1998 | Gupta et al. ..................... 703/7 |
| 5,870,588 A * | 2/1999 | Rompaey et al. ............... 703/13 |
| 6,236,908 B1 * | 5/2001 | Cheng et al. ..................... 701/1 |
| 6,363,316 B1 * | 3/2002 | Soliman et al. ............... 701/104 |
| 6,366,293 B1 * | 4/2002 | Hamilton et al. ................. 703/7 |
| 6,760,693 B1 * | 7/2004 | Singh et al. ....................... 703/8 |
| 6,826,436 B1 * | 11/2004 | Bogan ............................. 700/98 |
| 7,038,700 B2 * | 5/2006 | Kawaguchi et al. ......... 345/420 |
| 7,054,793 B2 * | 5/2006 | Moritz et al. ..................... 703/7 |
| 7,292,964 B1 * | 11/2007 | Mukherjee et al. ............. 703/7 |
| 7,672,822 B2 * | 3/2010 | Lee et al. ........................... 703/7 |
| 7,848,910 B2 * | 12/2010 | Schantl et al. ................... 703/8 |

(Continued)

OTHER PUBLICATIONS

"Automated Translation of MATLAB Simulink/Stateflow Models to an Intermediate Format in HyVisual" by Rajarshi Ray, Master's Thesis pp. 1-52 Jun. 2007.*

(Continued)

Primary Examiner — Akash Saxena
(74) Attorney, Agent, or Firm — Foley & Lardner LLP

(57) ABSTRACT

A method for automatically generating a multi-component multilevel model for simulation of an automotive propulsion system and/or subsystem. The method comprises a capture component and a build component. The capture component operates to automatically parse all relevant information of an existing model and to generate one or more files indicative of the systems and subsystems of the model. The files are created such that they may be efficiently searched, manipulated, and applied for subsequent use in various user defined models created through the build component. The build component obtains the information in the one or more files and additional user defined files based on user selections to automatically create an executable model ready for analysis.

17 Claims, 9 Drawing Sheets

(56) References Cited

U.S. PATENT DOCUMENTS

| | | | |
|---|---|---|---|
| 7,861,217 B2 * | 12/2010 | Ciolfi | 717/105 |
| 7,979,243 B1 * | 7/2011 | Mosterman et al. | 703/7 |
| 8,311,782 B2 * | 11/2012 | Minot | 703/8 |
| 2003/0036891 A1 * | 2/2003 | Aragones et al. | 703/8 |
| 2003/0149498 A1 * | 8/2003 | Rebello et al. | 700/97 |
| 2004/0002841 A1 * | 1/2004 | Mayuzumi et al. | 703/7 |
| 2004/0117749 A1 * | 6/2004 | Lalonde et al. | 716/11 |
| 2006/0064667 A1 * | 3/2006 | Freitas | 717/104 |
| 2006/0277010 A1 * | 12/2006 | Schutte et al. | 703/8 |
| 2009/0006367 A1 * | 1/2009 | Jacob et al. | 707/5 |
| 2009/0099824 A1 * | 4/2009 | Falash et al. | 703/8 |
| 2009/0265684 A1 * | 10/2009 | Fuchs et al. | 717/105 |
| 2010/0063790 A1 * | 3/2010 | Truscott et al. | 703/8 |
| 2010/0082303 A1 * | 4/2010 | Rousseau et al. | 703/1 |
| 2010/0318336 A1 * | 12/2010 | Falangas | 703/8 |
| 2011/0288841 A1 * | 11/2011 | Larsson et al. | 703/8 |

OTHER PUBLICATIONS

"Can I use MATLAB to access a relational database such as Sybase, Oracle, or Informix?" (MATLAB_Jun. 2009 hereafter) pp. 1-2 Last Modified: Friday, Jun. 26, 2009.*

Plug-in Development for OSATE by Peter Feiler; Software Engineering Institute Carnegie Mellon Univ.; pp. 1-182, 2004.*

* cited by examiner

FLEXIBLE EVALUATOR FOR VEHICLE PROPULSION SYSTEMS

CROSS-REFERENCE TO RELATED PATENT APPLICATIONS

The present application claims priority to U.S. Provisional Patent Application No. 61/0101,511, filed Sep. 30, 2008, and incorporated herein by reference in its entirety.

STATEMENT OF GOVERNMENT INTEREST

The United States Government claims certain rights in this invention pursuant to Contract No. W-31-109-ENG-38 between the United States Government and the University of Chicago and/or pursuant to DE-AC02-06CH11357 between the United States Government and UChicago Argonne, LLC representing Argonne National Laboratory.

FIELD OF THE INVENTION

The present invention relates generally to the field of systems and methods for vehicle modeling. More particularly, the present invention relates to automatic generation of computational models to evaluate automotive propulsion systems and subsystems.

BACKGROUND OF THE INVENTION

This section is intended to provide a background or context to the invention that is, inter alia, recited in the claims. The description herein may include concepts that could be pursued, but are not necessarily ones that have been previously conceived or pursued. Therefore, unless otherwise indicated herein, what is described in this section is not prior art to the description and claims in this application and is not admitted to be prior art by inclusion in this section.

The present invention relates generally to the field of systems and methods for automatically building a model to evaluate an automotive propulsion system and/or subsystems. More specifically the present invention relates to methods and systems for automating the design, analysis, and development of an automotive propulsion system and/or subsystem.

With the introduction of advanced propulsion technologies, including hybrid electric vehicles, fuel cells, etc, designers often must evaluate hundreds of vehicle propulsion system configurations for potential selection for a new or modified vehicle. Various configurations for evaluation may comprise, for example, a variety of powertrain types (conventional, electric, series, parallel, power split, etc), a multitude of component technologies (various types of transmission, engine, electric machines, battery, etc.), model complexity (steady-state, transients, etc.), and system controllers. Additionally, vehicles can be two or four wheel drive and have a variety of differentials, all of which may affect the performance of the vehicle. Still further, a model may consider various driving variables (steady-state conditions, transient effects such as acceleration and braking, grades, city/highway driving, etc.). These variables, plus others known in the art, but not mentioned here, can make up hundreds of configurations that must be taken into consideration when evaluating a vehicle propulsion system to arrive at an optimized system and/or system subcomponents for a particular vehicle design.

It is impracticable to build and evaluate a physical embodiment of every potential configuration and inefficient to do so for even a reasonable number of configurations. Accordingly, simulation may be used to develop and evaluate a large number of configurations relatively quickly and inexpensively. The benefits of modeling and simulation in allowing companies to accelerate the introduction of technology into the market have grown rapidly. With time, however, the size and complexity of simulation models have also increased, detracting from their efficiency.

In the transportation field, two principal techniques for simulating various powertrain configurations have been developed: (1) build all the simulation configurations by hand, and (2) modify a preexisting configuration. The first technique is used by conventional simulation applications such as AVL CRUISE and GT-DRIVE. Here, every model must be manually created by moving individual component models, for example, an engine, a clutch, and a fuel cell, from a library of component models into the simulation environment and then linking every component. The second is used in some other conventional simulation applications such as ADVISOR from AVL. However, in light of the vast number of potential combinations and complexity of such models, this technique is inefficient from both a modeling and data management perspective. Further, the number of permissible combinations that can be saved may be limited to an insufficient number. In either case, conventional simulation processes may take too long and have limited effectiveness and/or efficiency. In particular, development of a powertrain model for a vehicle may take several days to build and modifying such models requires additional time, all of which may more effectively be applied to running simulations on various configurations and analyzing the results of those simulations.

SUMMARY OF THE INVENTION

An embodiment of the present invention relates to a process for modeling an entire vehicle propulsion system and/or subsystems in a computer simulation environment. The process automatically builds a configuration of a propulsion system and/or subsystem in a matter of seconds, as opposed to the days required using conventional methods. The various component and system configuration options of the propulsion system are based on a user's selections. The process allows users to build any vehicle propulsion system and/or subsystem quickly by selecting various component and/or system models from a plurality of system libraries (i.e., engine plant, controller, actuator, sensor, etc.) that comprise a propulsion system and/or subsystem. Each library contains a complete characterization of that particular component. By selecting a plurality of models from the various libraries, a complete propulsion system and/or subsystem can efficiently be assembled and evaluated.

The process comprises a capture component and a build component. The capture component is capable of operating on an existing model to parse all relevant model information to generate one or more files (which may, for example, be XML files), thereby completely characterizing the systems and subsystems at each level of the model. The one or more generated files are created such that they may be efficiently searched, manipulated, and applied for subsequent use in various user defined models created through the build component. The build component obtains the information in the one or more files and additional user defined files based on user selections to create a new model that is complete and ready for analysis.

The process may further be configured to permit any set of models to be assembled and connected based on the contents of the files that may be automatically generated, offering users the ability to develop and evaluate a virtually unlimited number of configurations. By automatically generating the files, substantial time and effort to manually develop a model or file describing the system is avoided and model versioning issues are minimized. In one embodiment the files may comprise an extensible markup language ("XML") file. The XML format further facilitates manipulation, storage, and searching of model related information and characteristics. By describing each model and system in an XML format, the models may be stored in a relational database. To build a new model, the recursive model building process automatically builds any system and/or subsystem according to user choices using the automatically generated files. Thus, an entire model may be built starting from an empty window based on minimal user inputs from a Graphical User Interface ("GUI"). The process may be integrated into existing mathematical and simulation software applications. In particular, the modeling environment may be integrated into or configured to work with the Powertrain System Analysis Toolkit ("PSAT) developed by Argonne National Laboratory.

The data resulting from the executed simulation may be generated relating to characteristics of the performance and other parameters of the configured system and/or the subsystems under various conditions to evaluate subsystem interactions, performance, and overall suitability of the configuration. In one preferred embodiment, the resulting data are automatically saved for subsequent retrieval for analysis and comparison against other modeled configurations. The resulting data may further be associated with the various systems and subsystems making up the model.

The design and evaluation process is applicable to a variety of transportation systems including hybrid automobiles, light trucks, semi-trailers, and railroad locomotives. The approach is further applicable beyond the field of transportation, to virtually any field where complex models having a large number of components are combined to achieve an optimal solution for a particular system, including energy, infrastructure, and network systems.

These and other advantages and features of the invention, together with the organization and manner of operation thereof, will become apparent from the following detailed description when taken in conjunction with the accompanying drawings, wherein like elements have like numerals throughout the several drawings described below.

DETAILED DESCRIPTION OF VARIOUS EMBODIMENTS

Figure 1:
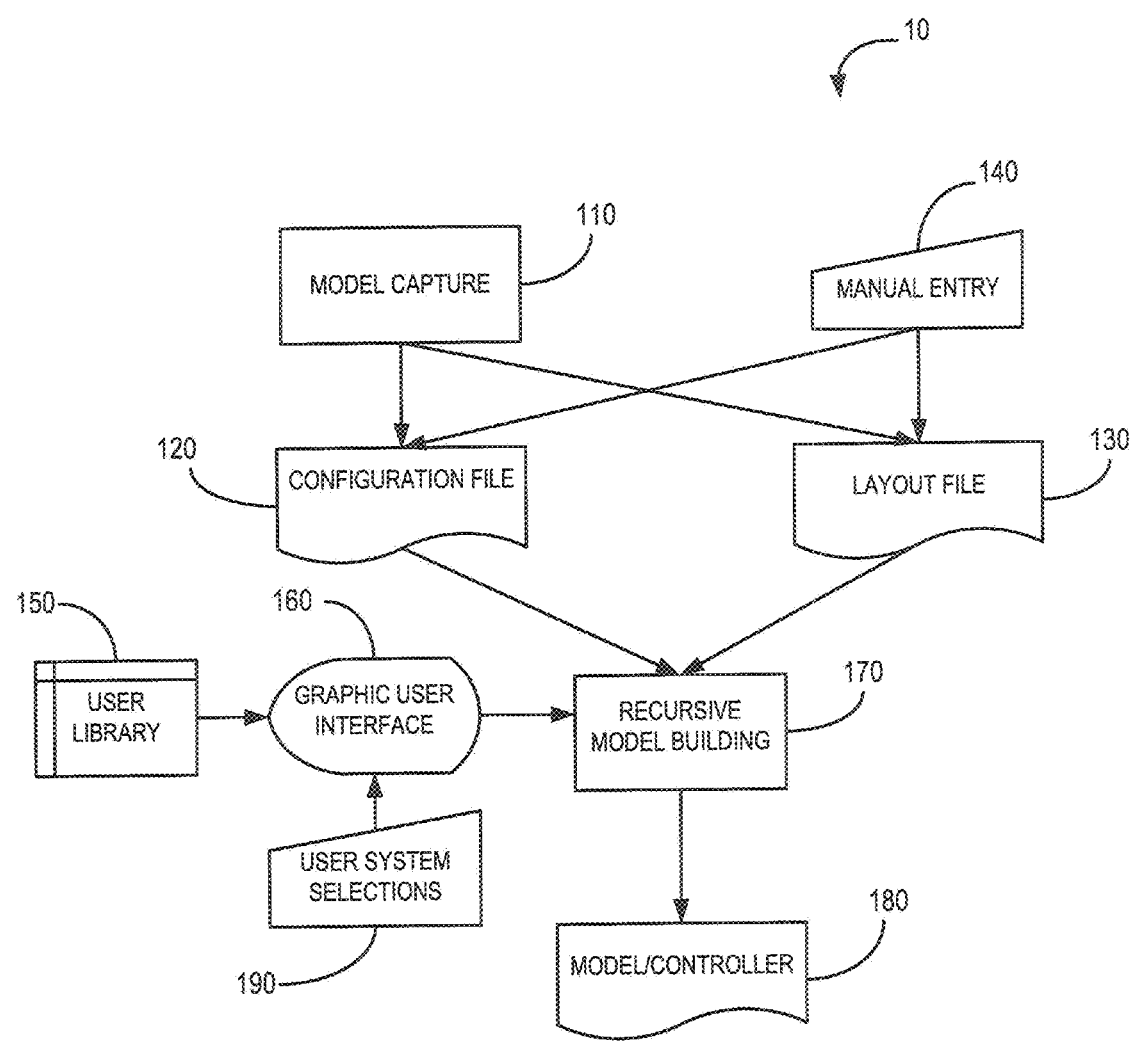
FIG. 1 is a chart illustrating a flexible simulation building process for building a vehicle propulsion simulation model according to an embodiment of the present invention.

FIG. 1 illustrates a flexible simulation building process 10 to evaluate vehicle propulsion systems according to one preferred embodiment of the present invention. The flexible simulation building process 10 comprises a model capture component 110, a configuration file 120, a layout file 130, a manual entry capability 140, a user library 150, a GUI 160, a recursive building component 170, an executable model 180, and a user system selections capability 190.

To facilitate explanation of the flexible simulation building process 10, the following terminology is introduced. In an embodiment, the flexible simulation building process 10 may work in conjunction with various software applications, and in a particular embodiment these may include the MATHWORKS SIMULINK/STATEFLOW software applications. A SIMULINK/STATEFLOW model may comprise multiple levels and sublevels. Any level of a model in SIMULINK/STATEFLOW may be decomposed into (a) subsystems/subcharts and (b) elements not in subsystems. Elements not in the subsystems may include blocks and lines. All elements not contained in the subsystems/subchart are referred to in this document as peripherals. Examples of peripherals include, but are not limited to, sum, goto, from, gain, and integrator blocks. That, is, any block in the SIMULINK library that is not a subsystem block. An example of a peripheral in STATEFLOW would be a STATEFLOW flow chart with equations.

The SIMULINK/STATEFLOW model with subsystems/subcharts and peripherals may be converted to an XML format. The XML format provides a number of benefits, including: efficient storage in a searchable database; automatic transformation of a model into other languages other than SIMULINK/STATEFLOW; automatic composition of multiple models stored in the database into one SIMULINK/STATEFLOW model; rapid substitution of one subsystem/subchart for other subsystem(s)/subchart(s). Characteristics of the XML format further allow the automated building of a SIMULINK/STATEFLOW model based on user selections in a graphical software interface. Because a subsystem can, itself, contain subsystems and peripherals, the model building component recursively converts every level of the SIMULINK/STATEFLOW model into an XML format.

The flexible simulation building process 10 uses information characterizing the entirety of a vehicle model stored in the configuration file 120 and the layout file 130. In an embodiment, one or more of the configuration files 120 and one or more of the layout files 130 comprise XML files, and in a particular embodiment comprise files comprising the Argonne Model Descriptor Specification ("XAMDS"), provided as Appendix A attached hereto. The configuration file 120 and the layout file 130 may be created manually by a user through the manual entry capability 140, including a standard text editor. Alternatively, the configuration file 120 and the layout file 130 may be created automatically by reading an existing model through the model capture component 110. The flexible simulation building process 10 may further rely on user or otherwise defined subsystem/subcharts stored in the user library 150.

A model may be built based on information contained in the above as specified by a user of the flexible simulation building process 10. In an embodiment, the flexible simulation building process 10 is adapted to receive input from a GUI 160 from which a user specifies the subsystem/subcharts from the user library 150 to add to the model. The recursive building component 170 selects one or more configuration files 120 and one or more layout files 130, and applies choices made by the user in the GUI 160 to build the model using library blocks from the user library 150 and library blocks from additional source, which may include standard blocks from a SIMULINK/STATEFLOW library. The result is an executable model 180. In an embodiment, the executable model 180 may be a SIMULINK/STATEFLOW file. Results obtained from the executable model 180 may be stored and associated as necessary with information contained in the one or more configuration files 120, the one ore more layout files 130, and the user library 150.

Figure 2:
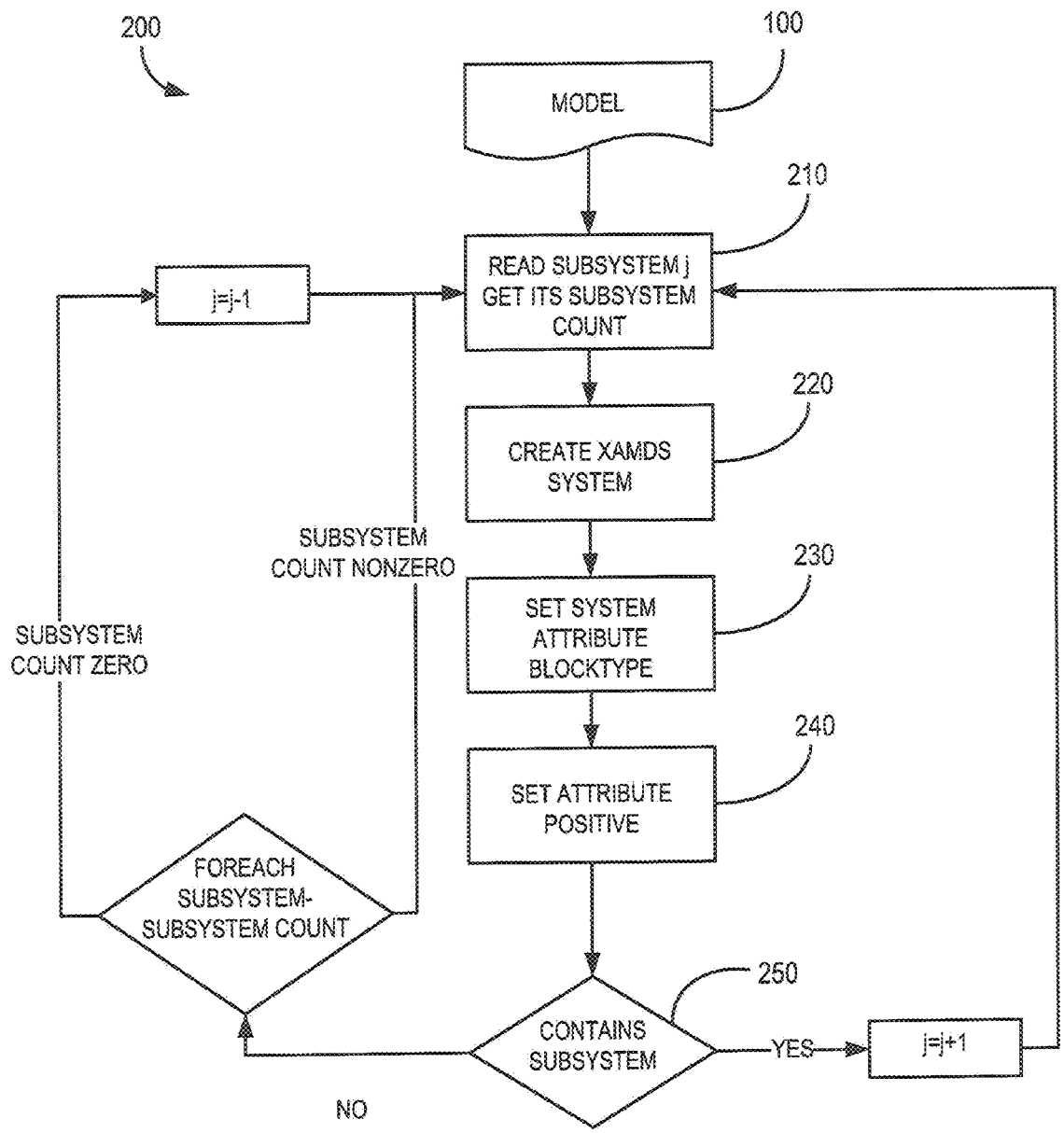
FIG. 2 is a chart illustrating a subsystem parser of the flexible simulation building process of FIG. 1.

With reference to FIGS. 1 and 2, the model capture component 110 captures a model 100. The model 100 may be a preexisting model. The model capture component 110 is configured to generate the configuration file 120 and the layout file 130 representing the model 100. The model capture component 110 may comprise a computer program in an embodiment, and in particular embodiments the model capture component 110 may be adapted to operate in the MATLAB environment. The model 100 captured by the model capture component 110 comprises a plurality of components and sub-components representing the simulated system, for example, a vehicle powertrain. The model 100 may be created and or reside in one or more simulation environments, including SIMULINK MODEL and/or STATEFLOW CHART.

Figure 3:
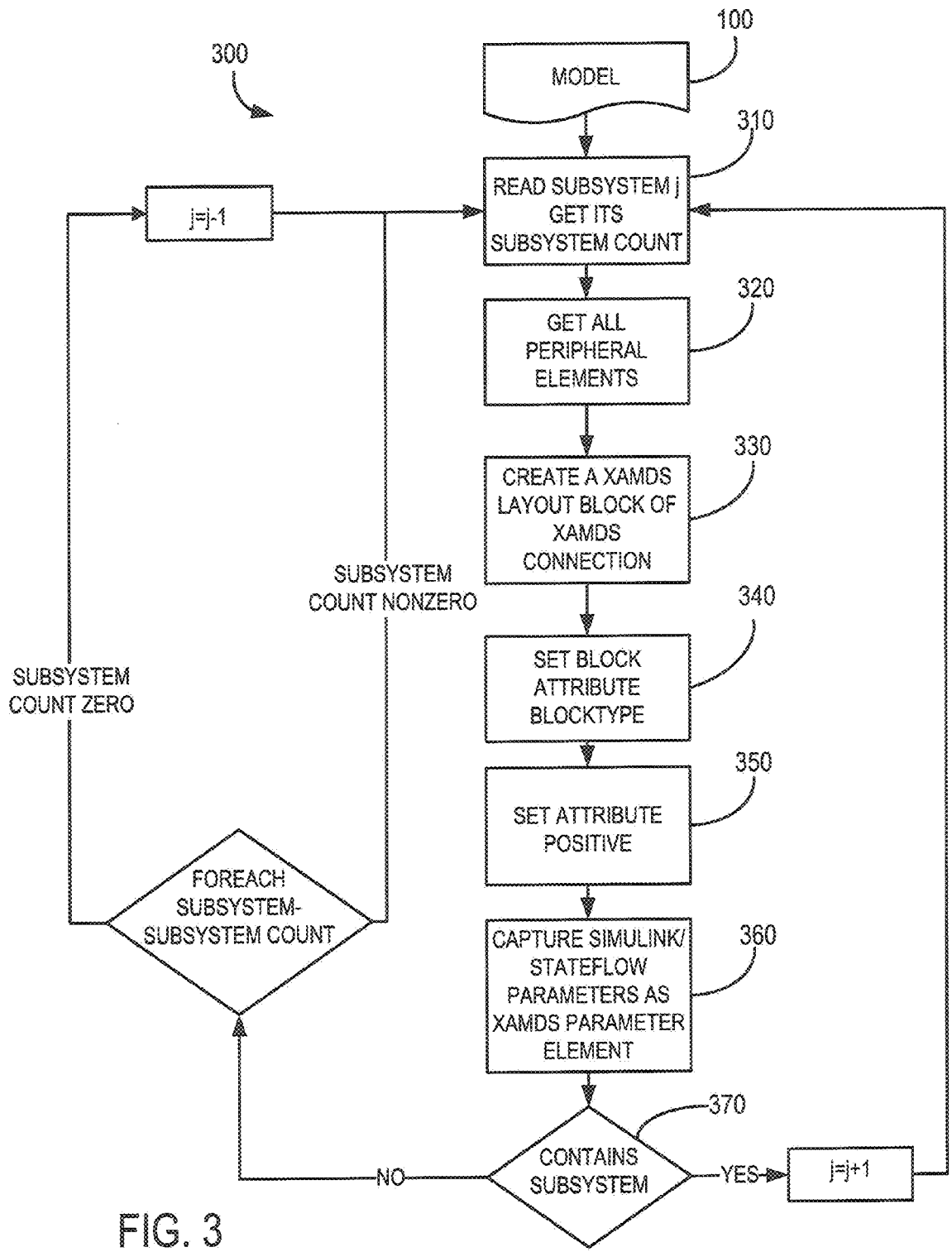
FIG. 3 is a chart illustrating a peripheral parser of the flexible simulation building process of FIG. 1.
Figure 4:
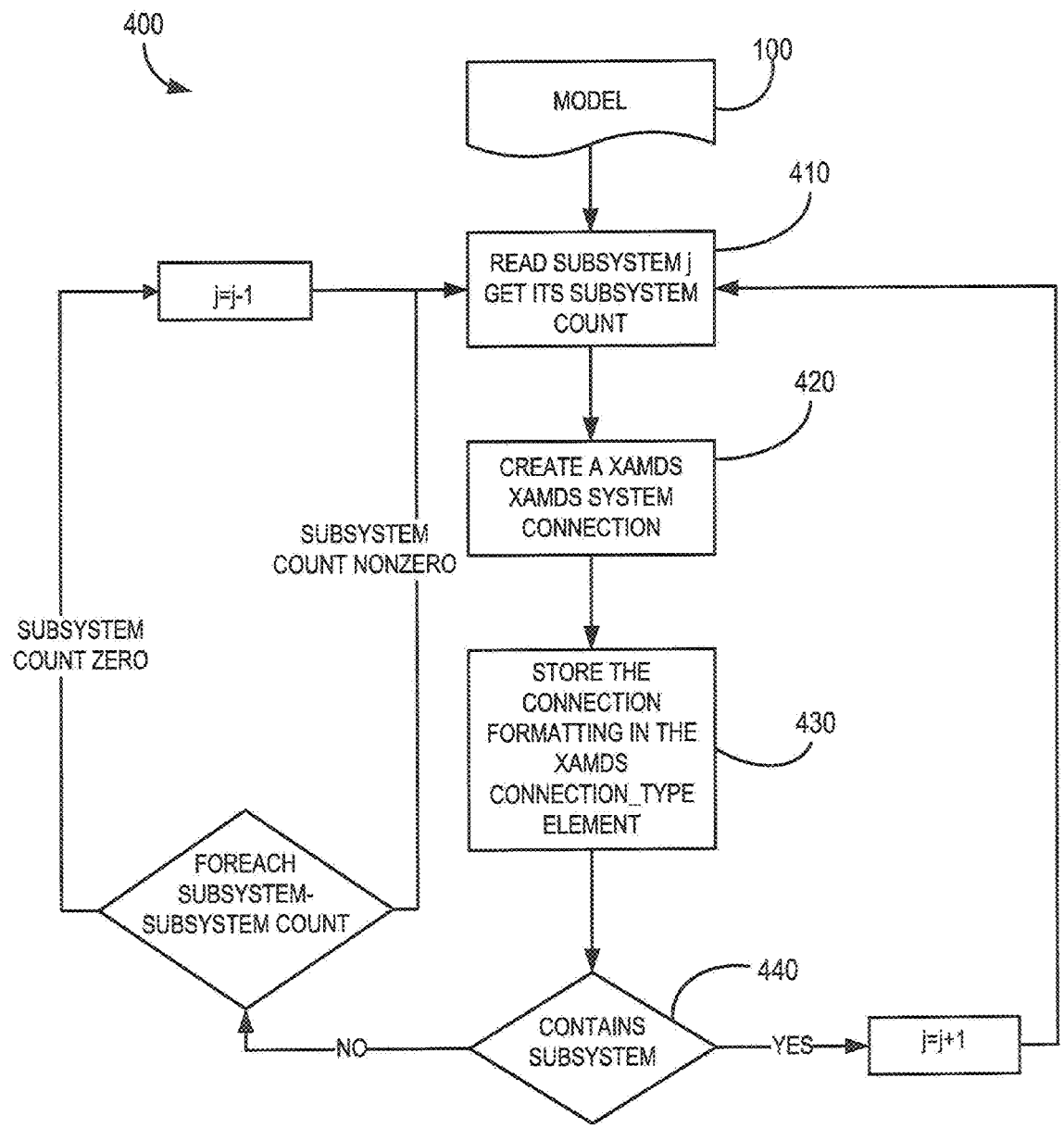
FIG. 4 is a chart illustrating a connection parser of the flexible simulation building process of FIG. 1.

With reference to FIGS. 2-4, the model capture component 110 capturing the model 100 comprises three subroutines, including a subsystem parser 200, a peripheral parser 300, and a connection parser 400. As previously described, the model capture component 110 generates from the model 100 the configuration file 120 and the layout file 130, which in an embodiment, comprises XML files. The model 100 may include a plurality of components, and each component may comprise one or more sub-systems, each of the one or more sub-systems may further comprise one or more sub-systems, and so forth defining a plurality of levels in the model 100. The configuration file 120 and the layout file 130 may be generated for each of the plurality of levels of the model 100.

As depicted in FIG. 2, the subsystem parser 200 comprises a reading component 210, a creation component 220, an attribute type setting component 230, an attribute position setting component 240, and a subsystem detection capability 250. The subsystem parser 200 recursively moves through the tree hierarchy of the plurality of levels of the model 100, replacing subsystem model names with system references. In an embodiment, the system references are in XML format, and more particularly may comprise standardized names in XML format.

The subsystem parser 200 accomplishes this by reading the plurality of subsystems from the model 100 at the reading component 210. The reading component 210 further obtains subsystem count j. The subsystem reference of the subsystem j is created in the creation component 220. The attribute type of the subsystem is established at the attribute type setting component 230, using the "Blocktype" attribute to hold the subsystem reference to a library block type. The subsystem parser 200 further captures information indicative of a position of each subsystem at the attribute position setting component 240. The subsystem detection capability 250 determines whether the subsystem j contains a subsystem. If a subsystem is detected by the subsystem detection capability 250, the subsystem count j is incremented and is returned to the reading component 210. If a subsystem is not detected by the subsystem detection capability 250, for each of the plurality of subsystems where the subsystem count is equal to zero, the subsystem count j is decreased by one and is returned to the reading component 210. On the other hand, where the subsystem count is not equal to zero, the subsystem count is unaltered and is returned to the reading component 210.

With reference to FIG. 3, the peripheral parser 300 comprises a reading component 310, an element obtaining component 320, a creation component 330, an attribute type setting component 340, an attribute position setting component 350, a parameter capture component 360, and a subsystem detection capability 370. The peripheral parser 300 captures an object parameter and a dialog parameter for each of the plurality of subsystems of the model 100. In an embodiment, the object parameter and the dialog parameter are obtained using the MATLAB "get_param" function. The peripheral parser 300 stores the object parameter and the dialog parameter in the layout file 130.

The peripheral parser 300 recursively moves through the tree hierarchy of the plurality of levels of the model 100. At the reading component 310, the subsystem j from the model 100 is read. The reading component 310 further obtains subsystem count j. The peripheral elements are obtained at the element obtaining component 320. A layout block and or a connection is created for the subsystem j at the creation component 330. The attribute type is established at the attribute type setting component 340. The attribute position is set at the attribute position setting component 350: The object parameter and the dialog parameter are obtained at the parameter capture component 360 and set as parameter elements. In an embodiment, the parameter elements are set as XML parameter elements. The subsystem detection capability 370 determines whether the subsystem j contains a subsystem. If a subsystem is detected by the subsystem detection capability 370, the subsystem count j is incremented and is returned to the reading component 310. If a subsystem is not detected by the subsystem detection capability 370, for each of the plurality of subsystems where the subsystem count is equal to zero, the subsystem count j is decreased by one and is returned to the reading component 310. On the other hand, where the subsystem count is not equal to zero, the subsystem count is unaltered and is returned to the reading component 310.

Turning to FIG. 4, the connection parser 400 comprises a reading component 410, a connection creation component 420, an storage component 430, and a subsystem detection capability 440. The connection parser 400 recursively moves through the tree hierarchy of the plurality of levels of the model 100 and captures any connections that may exist between each subsystem block. The connection parser 400 stores the connection information in the configuration file 120.

At the reading component 410, the subsystem j from the model 100 is read, capturing any connection for the subsystem j. The reading component 410 further obtains subsystem count j. A connection is created for the subsystem j at the connection creation component 420. A connection format for each captured connection is stored by the storage component 430. In an embodiment, the connection format is set as an XML connection type element. The subsystem detection capability 440 determines whether the subsystem j contains a subsystem. If a subsystem is detected by the subsystem detection capability 440, the subsystem count j is incremented and is returned to the reading component 410. If a subsystem is not detected by the subsystem detection capability 440, for each of the plurality of subsystems where the subsystem count is equal to zero, the subsystem count j is decreased by one and is returned to the reading component 410. On the other hand, where the subsystem count is not equal to zero, the subsystem count is unaltered and is returned to the reading component 410.

As described above, the model capture component 110 detects and captures the model 100, storing data indicative of the model in configuration file 120. The configuration file 120 comprises a plurality of entries characterizing components and sub-components of the model 100. One or more elements may be associated with at least one of each of the entries. The elements are indicative of the model components and permit storage, searching, indexing, and manipulation of the configuration file 120 and the entries therein. Storage of the elements may further be accomplished using a relational database. In an embodiment, the elements are XML markups, and in particular, may be defined by the XML Argonne Model Descriptor Specification—XAMDS.

Figure 5:
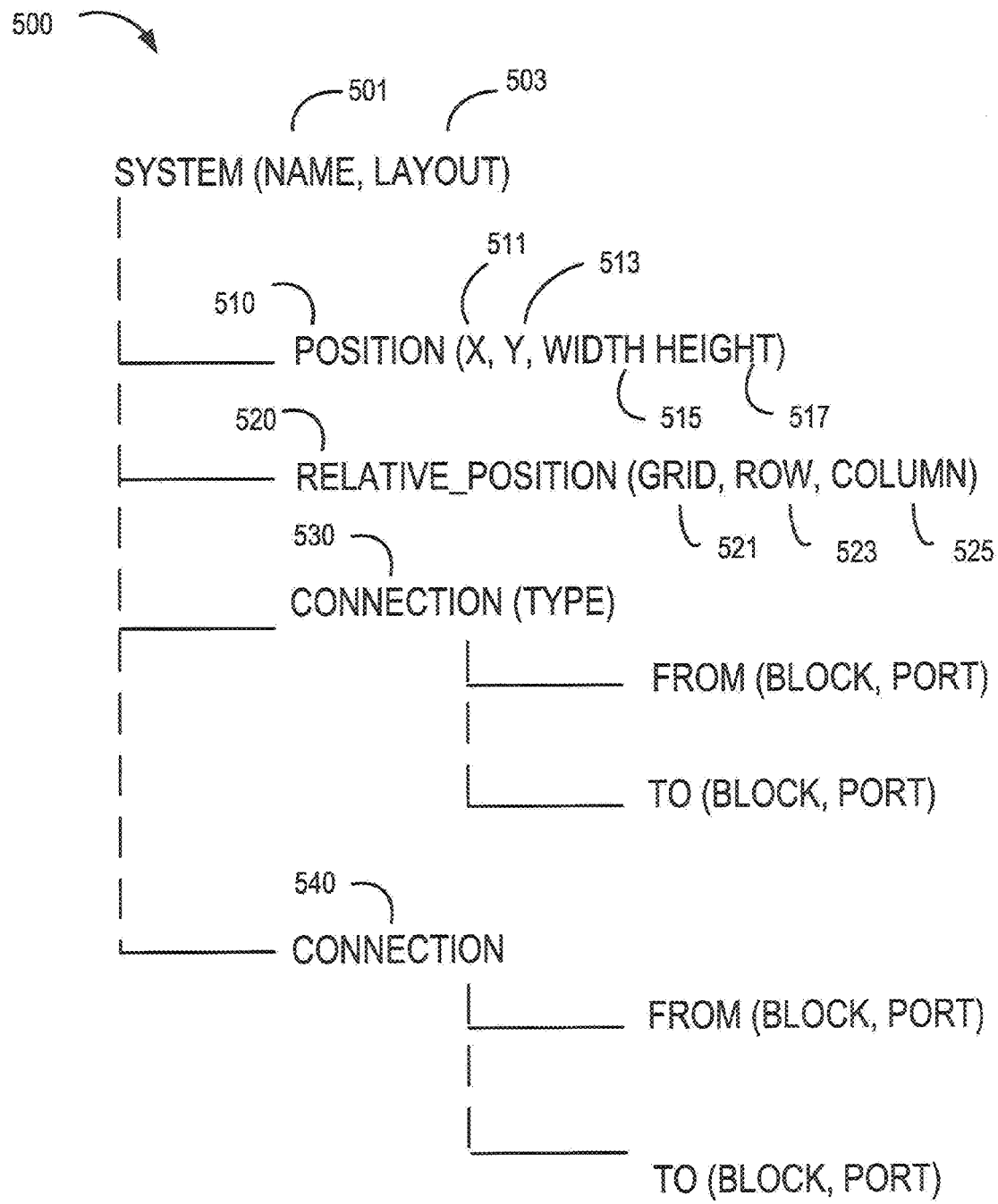
FIG. 5 illustrates a format of a configuration file generated by the subsystem parser, the peripheral parser, and the connection parser of FIGS. 2-4.

As depicted in FIG. 5, the configuration file 120 comprises a plurality of elements, which are defined as a system 500. The system. 500, includes a first attribute and a second attribute. The first attribute may be a name attribute 501. The second attribute may be a layout attribute 503. The name attribute 501 references a subsystem model contained in the user library 150. The reference to the subsystem model may be configured to point to a particular model parameter. In an embodiment, the subsystem model points to a SIMULINK/STATEFLOW model parameter. This is accomplished by setting the XAMDS model attribute of the system 500 to the name of the model 100. This value can be hard coded in the file or left for the user interface to set.

The system 500 further comprises a position element 510 that may include attributes of a X position 511, a Y position 513, a width 515, and a height 517. The values of these attributes define the absolute positions of the system 500 in the model 100. In an embodiment, in place of the position element 510, a relative position attribute 520 may be used. The relative position attribute 520 may include the attributes of a grid 521, a column 523, and a row 525. The relative position attribute 520 is part of the implementation of an alternate method of placing a subsystem in a model 100 by using coordinates relative to a grid element defined in the corresponding layout file 130. The configuration file 120 may further include a connection (type) element 530 and a connection element 540. Each of these are addressed below.

Figure 6:
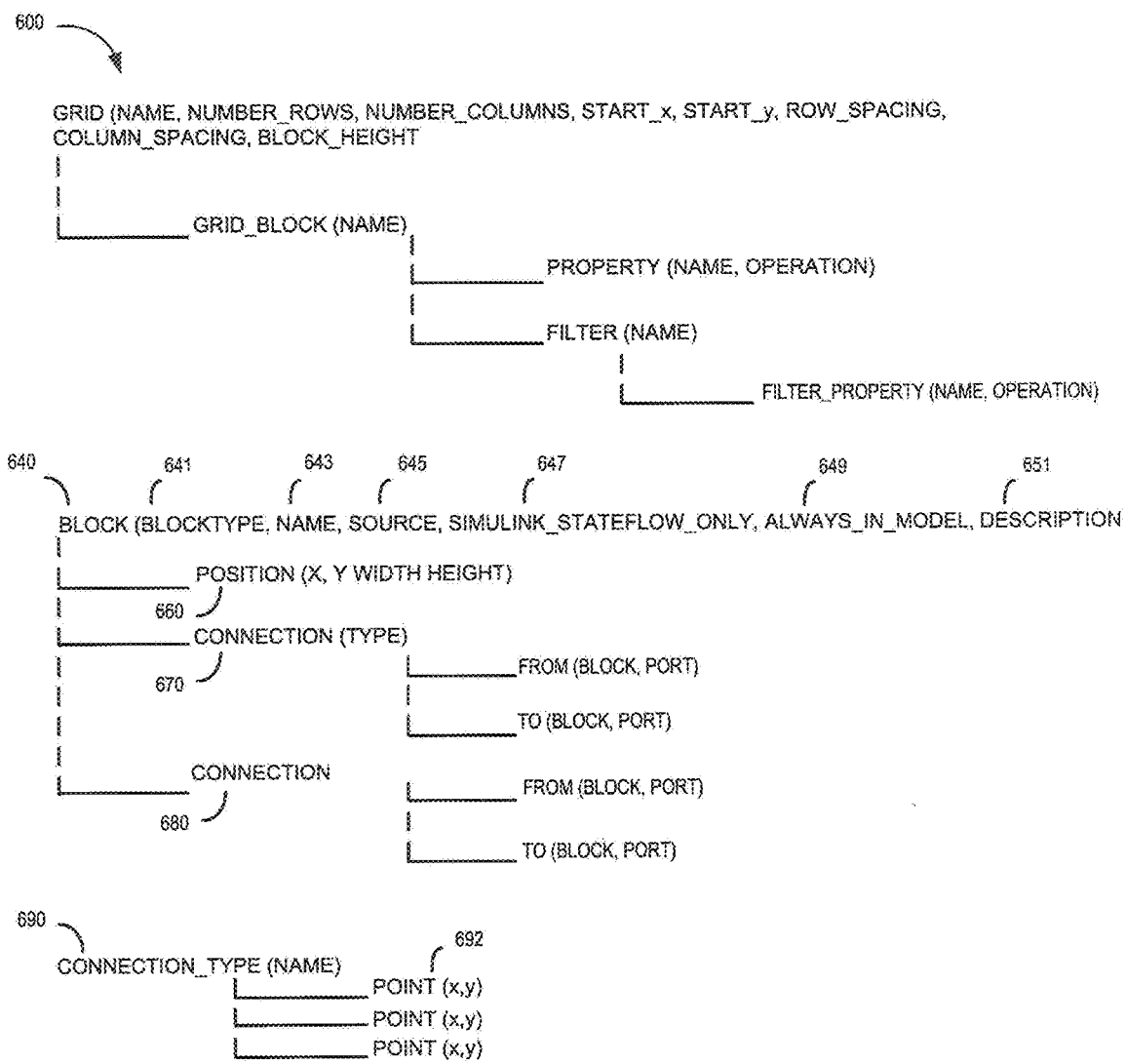
FIG. 6 illustrates a format of a layout file generated by the subsystem parser, the peripheral parser, and the connection parser of FIGS. 2-4.

The model capture component 110 may be used to automatically create the configuration file 120 and the layout file 130. The configuration file 120 and the layout file 130 may also be created by hand using the manual entry capability 140. The manual creation capability permits users to add further elements that may not be automatically inferred from the model structure, but facilitate the reusability of the file across multiple subsystems. In an embodiment, the additional elements comprise XAMDS elements. With reference to FIGS. 1 and 6, one such XAMDS element, for example, is a grid element 600. The grid element 600 defines a region in the model 100 of regularly spaced locations of substantially equal size.

For instance, in a SIMULINK model a subsystem can be placed at any one of these predefined regularly spaced locations. The grid element 600 further includes a XAMDS child element of a prototype block. Any characteristics of the prototype block are applied to every block that is added to the grid element 600. For example, a common bus connection between every block in the grid element 600 and a main bus may be assigned to the prototype block. This common connection applied to any block is subsequently added to the grid element 600. In generally, all properties of the prototype block are applied to all blocks in the grid element 600. However, exceptions can be made by using a filter element of the prototype block. The filter element looks for a specific property value or a set of property values of any block that is added to the grid element 600. If the block has the corresponding property values, the prototype block is not applied. The grid element 600 can have one or more prototype blocks and a prototype block can have one or more filters. The grid element 600 is coded in the layout file 130 and the layout file 130 can include one or more grid elements 600 all referenced by a respective name element. A block added to a grid element can have relative coordinates based on the row and the column positions in the grid element 600 or can have absolute coordinates. If the block is given in absolute coordinates, the parent grid element is determined automatically by the model capture component 110.

As shown in FIG. 6, the layout file 130 further includes a block element 640 and a connection_type element 690. Again, in an embodiment the block element 640 and the connection_type element 690 may be defined as XAMDS elements. The block element 640 may either fully define each of the blocks with a fixed position in the model 100 or can partially define the characteristics of system elements included in the configuration file 120 that have a relative position element 520. The system 500 does not have a defined position until the user associates the system 500 with a specific grid element. The association may be accomplished through a graphical interface. A link between the system 500 in the configuration file 120 and the grid element 600 in the layout file 130 may be made by using the relative position element 520.

The block element 640 may further include a plurality of sub-elements. The sub-elements may comprise a position element 660, one or more parameter elements, and one or more block connection type 670 and block element connections 680. The position element 660 and the connection elements 670/680 may be substantially identical to those defined for the system 500 in the configuration file 120. The parameter element (not shown) allows the properties of the block to be encoded in the block element 640. The parameter element may include attributes of name and a value. In an embodiment, any SIMULINK/STATEFLOW object parameter or dialog parameter may be set using the set_param MATLAB function, as defined by the script "get_param('name', value)" where name and value are the attributes defined for the respective parameter elements name and value.

The block element 640 may further include attributes of a blocktype 641, a name 643, a source 645, a SIMULINK_STATEFLOW_only attribute 647, an always_in_model attribute 649, and a description attribute 651. The blocktype 641 maps to the blocktype in the model 100, for example, in SIMULINK, or to a component type in, for example, PSAT. The name 643 may be the SIMULINK/STATEFLOW block/chart taken from the library and added to the model 100. The source 645 may be a library source for the block/chart. In an embodiment, the source 645 may be either the SIMULINK library or the user's library 150. The SIMULINK_STATEFLOW_only attribute 647 defines whether the block/chart should be displayed only in SIMULINK/STATEFLOW and not appear in the graphical interface of the modeling environment. The always_in_model attribute 649 may separate one or more layout blocks that are always present in the model 100 and those that appear under specific conditions as determined by the model capture component 110.

The connection_type element 690 may contain formatting information for each connection element 540. Each connection element 540 has a type attribute 531 that can reference a connection type element 690. The connection_type element

690 may include one or more point elements 692. The point elements 692 may specify a shape of the connection. Any number of point elements 692 may be defined in the connection_type element 690.

One or more keywords may further be defined to reference characteristics of the model 100 that are undetermined until time of building the executable model 180. Keywords may include, for instance: [system_name], [model_name], [end_port_x], [end_port_y], [begin_port_x], [begin_port_y], and [system_number]. By way of example, the one or more of the point elements 692 may reference the keyword [end_port_x] to determine the starting point of the connection_type element 690 with respect to the port of the block element 640. The actual position of the port is not known until the block element 640 is instantiated in the executable model 180.

To automatically generate the new model for analysis, the executable model 180, the information contained in the configuration file 120 and the layout file 130 is combined. By merging contents of the configuration file 120 and the layout file 130 the executable model 180 is completely specified and automatically, generated based on user inputs. The process of building a new model from a collection of one or more layout files 130 and one or more configuration files 120 uses a recursive model building process. The recursive model building process comprises: an expander component 700, a builder component 800, and a router component 900. Each of these components is described in detail below.

Figure 7:
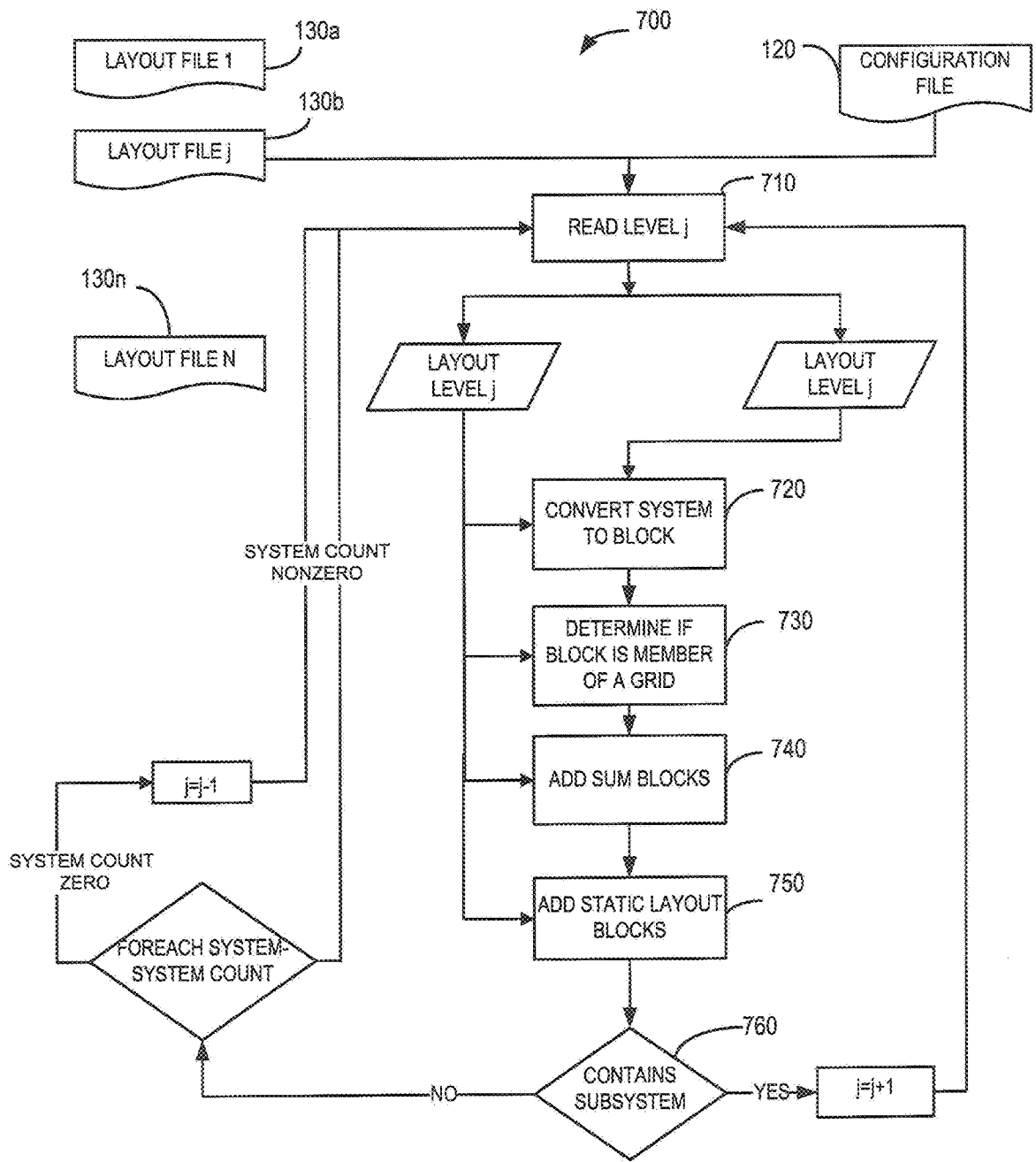
FIG. 7 is a chart illustrating an expander component of the flexible simulation building process of FIG. 1.

With reference to FIG. 7, the expander component 700 comprises a reading component 710, a conversion component 720, a grid determining component 730, a sum block addition component 740, a static block layout component 750, and a subsystem detection capability 760. The expander component 700 obtains the configuration file 120 and a layout file 130a at the top level of the model that is to be automatically generated.

The expander component 700 reads the model level j at the reading component 710. The common information contained in the configuration file 120 at the model level j and the layout file 130a at the model level j are merged in the succeeding components of the expander component 700. The conversion component 720 converts system information to block information from the configuration file 120 and the layout file 130a. The grid determining component 730 looks up the positions of the subsystem and the peripherals in the layout file 130a, or they are determined by using the properties of the grid elements 600. At build time, one or more of, for example, a sum block is added automatically to the merged file in the sum block addition component 740. The static block layout component 750 obtains the information in the configuration file 120 and the layout file 130a, including block formatting information, and adds it to the merged file.

The subsystem detection capability 760 determines whether the level j contains a subsystem. If a subsystem is detected by the subsystem detection capability 760, the subsystem level count j is incremented and is returned to the reading component 710. If a subsystem is not detected by the subsystem detection capability 760, for each of the plurality of subsystems where the subsystem count is equal to zero, the subsystem count j is decreased by one and is returned to the reading component 710. On the other hand, where the subsystem count is not equal to zero, the subsystem count is unaltered and is returned to the reading component 710. Accordingly, the expander component 700 moves to the next level of the configuration file 120 and merges a layout file 130b for that level with its corresponding information. This operation continues recursively, moving from one layer of the tree to the next, through layer n containing a layout file 130n.

As this process progresses, the expander component 700 flattens each of the trees and determines the path of each block in preparation of the builder component 800 and adds a path element to each block definition in the flattened tree.

Figure 8:
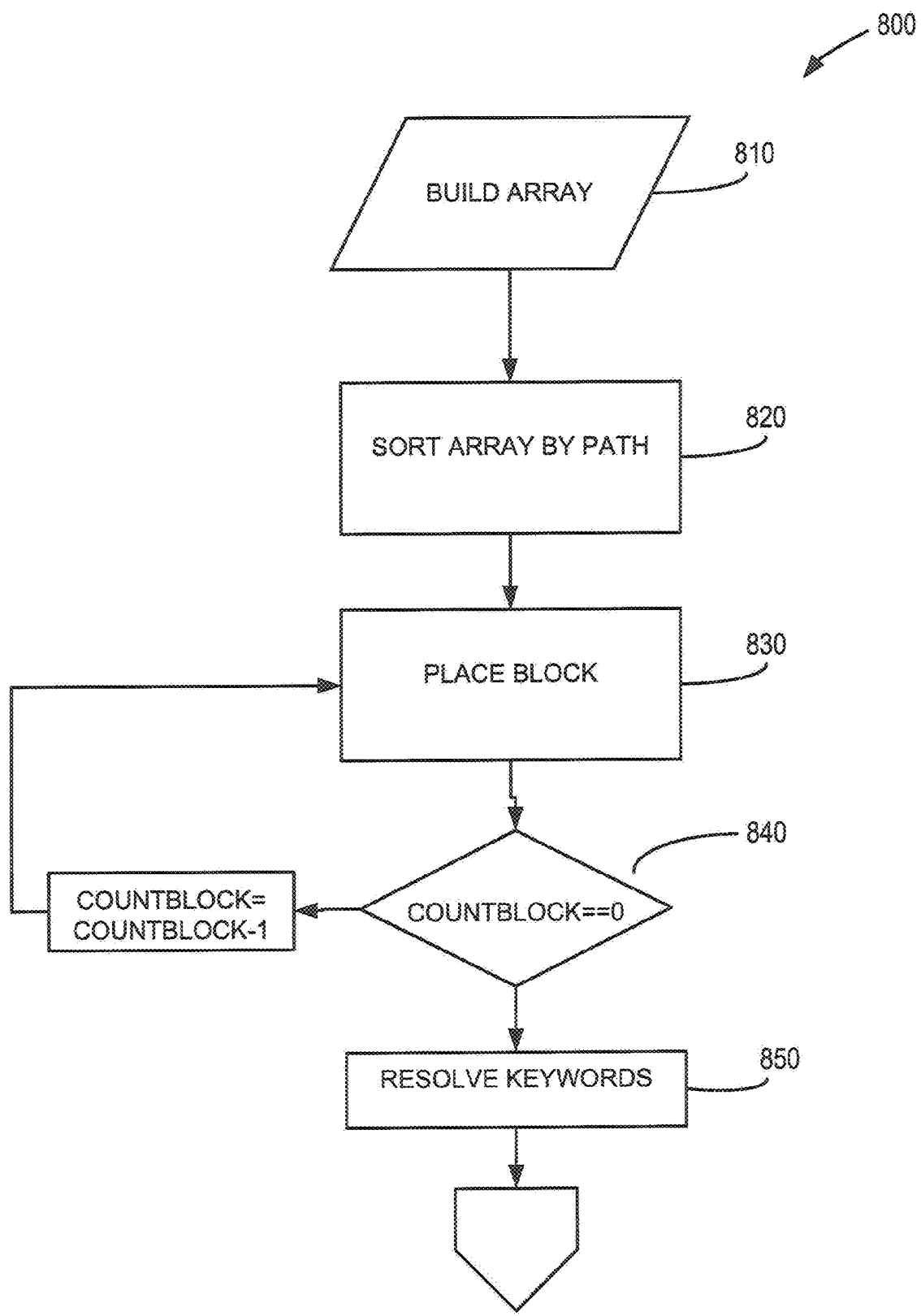
FIG. 8 is a chart illustrating a builder component of the flexible simulation building process of FIG. 1.

The builder component 800 instantiates the block elements 640 in the flattened tree. The builder component 800, as depicted in FIG. 8, comprises an array building component 810, a path sorting component 820, a placing component 830, a block count detection capability 840, and a keyword resolution component 850. In an embodiment, the builder component 800 uses the "add_block" function in MATLAB or the STATELOW API Block/Charts that may be added to the subsystem/subchart. The path variables are sorted in the path sorting component 820, determining path length. The placing component 830 adds the block elements 640 in order from a shortest path to a longest path length. The block count detection capability 840 determines whether any blocks remain to be placed. If the block count is not equal to zero the block count is reduced by 1 and the process is returned to the placing. component 830. If the block count is equal to zero the builder component 800 makes an additional pass through the model resolving any of the keywords in the keyword resolution component 850.

Figure 9:
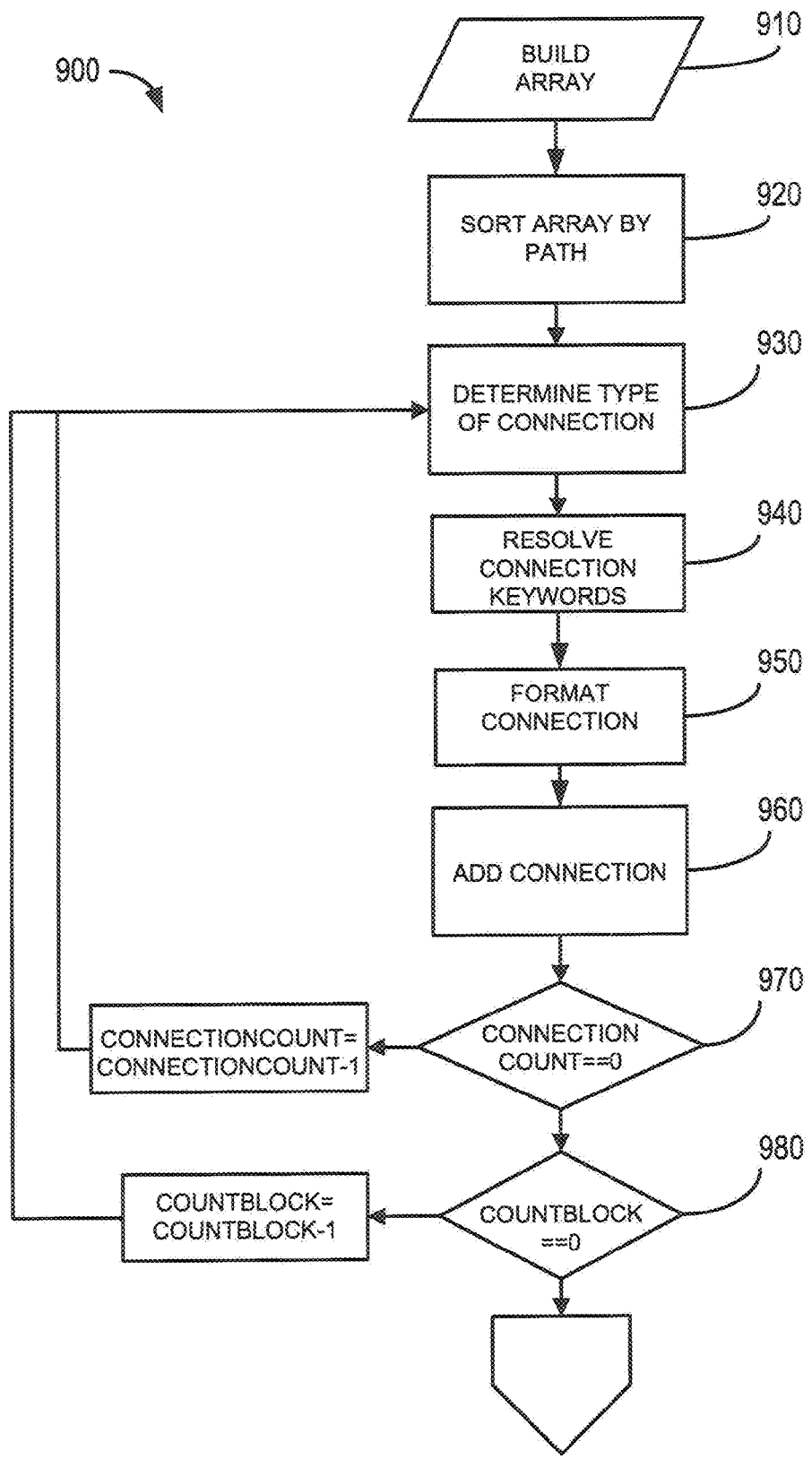
FIG. 9 is a chart illustrating a router component of the flexible simulation building process of FIG. 1.

The partially built model is passed to the routing component 900. The routing component 900 instantiates each of the one or more connection elements 670/680, linking the block elements 640 together in the model. In an embodiment, the linking is accomplished using the "add_line function" in MATLAB. With reference to FIG. 9, the routing component 900 comprises an array building component 910, a path sorting component 920, a connection type determining component 930, a keyword resolving component 940, a format connection component 950, a connection adding component 960, a connection count detection capability 970, and a block count detection capability 980. The path variables are sorted in the a path sorting component 920, therein determining path length. One or more bus sizes are calculated and one or more bus creator blocks are instantiated in the executable model 180 by the routing component 900. Any of the keywords are resolved in the keyword resolution component 940. The connection count detection capability 970 determines whether any connections remain to be added. If the connection count is not equal to zero the connection count is reduced by 1 and the process is returned to the connection type determining component 930. If the block count is equal to zero, the routing component 900 moves to the block count detection capability 980. The block count detection capability 980 determines whether any blocks remain for connections to be added. If the block count is not equal to zero, the block count is reduced by 1 and the process is returned to the connection type determining component 930. If the block count is equal to zero, the routing component 900 is stopped, signifying the executable model 180 is complete.

Various embodiments described herein are described in the general context of method steps or processes, which may be implemented in an embodiment by a computer program product, embodied in a computer-readable medium, including computer-executable instructions, such as program code, executed by computers in networked environments. A computer-readable medium may include removable and non-removable storage devices including, but not limited to, Read Only Memory (ROM), Random Access Memory (RAM), compact discs (CDs), digital versatile discs (DVD), etc.

Embodiments of the present invention may be implemented in software, hardware, application logic or a combination of software, hardware and application logic. The software, application logic and/or hardware may reside, for example, on a chipset, a memory device or a processor.

The foregoing description of embodiments of the present invention have been presented for purposes of illustration and description. It is not intended to be exhaustive or to limit the present invention to the precise form disclosed, and modifications and variations are possible in light of the above teachings or may be acquired from practice of the present invention. The embodiments were chosen and described to explain the principles of the present invention and its practical application to enable one skilled in the art to utilize the present invention in various embodiments and with various modifications as are suited to the particular use contemplated. The features of the embodiments described herein may be combined in all possible combinations of methods, apparatus, modules and systems.

What is claimed is:

1. A method of automatically generating a simulation model for evaluating performance characteristics of an automotive propulsion system that includes a plurality of levels, the method comprising:
    capturing automotive propulsion information from a first simulation environment indicative of an existing simulation model characteristic of an associated automotive propulsion system, the system including a plurality of levels, each level comprising one or more automotive subsystems and one or more peripherals, the automotive propulsion information including information describing a configuration of each of the one or more automotive subsystems and each of the one or more peripherals and information describing a layout of each of the one or more automotive subsystems and each of the one or more peripherals;
    converting the automotive propulsion information from a first format to a second format;
    for each level of the plurality of levels:
        storing the information describing the configuration of each of the one or more automotive subsystems and each of the one or more peripherals contained within the each level in the second format in a configuration file associated with the each level; and
        storing the information describing the layout of each of the one or more automotive subsystems and each of the one or more peripherals contained within the each level in the second format in a layout file associated with the each level;
    selecting a plurality of subsystems for inclusion into a second simulation model, the plurality of subsystems being characterized in the configuration files and the layout files;
    building the second simulation model in a second simulation environment from the information contained with the configuration files and the layout files, wherein one or more of the layout files includes a grid element comprising one or more grid blocks and a prototype block that includes a set of property values, wherein the one or more grid blocks include one or more block elements and a filter element, and wherein the set of property values of the prototype block are applied to a block element of the one or more block elements when the block element does not match the filter element; and
    analyzing performance characteristics of the built simulation model, thereby enabling determination of a desired form of the automotive propulsion system.

2. The method claim 1, wherein the existing simulation model includes a plurality of levels.

3. The method of claim 1, wherein the second format comprises an XML format, thereby establishing a relational database for creation and analyzation of various selectable systems.

4. The method of claim 3, wherein the XML format comprises a standardized format indicative of a plurality of components and a plurality of vehicle subsystems of the automotive propulsion system.

5. The method of claim 1, further comprising:
    converting the automotive propulsion information from the second format to at least a portion of a third format, wherein the third format and the first format are substantially identical.

6. The method of claim 1, wherein the configuration file associated with the each level is readable by a relational database.

7. The method of claim 1, wherein the second simulation environment comprises a different simulation environment application from an application of the first simulation environment.

8. The method of claim 1, wherein the capturing step further comprises:
    parsing the plurality of subsystems;
    parsing one or more peripherals; and
    parsing one or more of connections, wherein the one or more peripherals may comprise a parameter of the system, and wherein each of the one or more connections connects a first subsystem of the plurality of subsystems to a second subsystem of the plurality of subsystems.

9. The method of claim 1, wherein the building step further comprises:
    expanding the plurality of subsystems;
    building the plurality of subsystems; and
    interconnecting the plurality of subsystems with the one or more connections.

10. The method of claim 1, wherein the selecting step comprises user selection of a plurality of subsystems through a graphical user interface.

11. A non-transitory computer-readable storage medium having computer code stored thereon, the computer code comprising:
    computer code for capturing automotive propulsion information from a first simulation environment indicative of an existing simulation model characteristic of an associated automotive propulsion system, the system including a plurality of levels, each level comprising one or more automotive subsystems and one or more peripherals, the automotive propulsion information including information describing a configuration of each of the one or more automotive subsystems and each of the one or more peripherals and information describing a layout of each of the one or more automotive subsystems and each of the one or more peripherals;
    computer code for converting the automotive propulsion information from a first format to a second format;
    computer code for storing for each level of the plurality of levels the information describing the configuration of each of the one or more automotive subsystems and each of the one or more peripherals contained within the each level in the second format in a configuration file associated with the each level; and
    computer code for storing for each level of the plurality of levels the information describing the layout of each of the one or more automotive subsystems and each of the one or more peripherals contained within the each level in the second format in a layout file associated with the each level;

computer code for selecting a plurality of subsystems for inclusion into a second simulation model, the plurality of subsystems being characterized in the configuration files and the layout files;

computer code for building the second simulation model in a second simulation environment from the information contained with the configuration files and the layout files, wherein one or more of the layout files includes a grid element comprising one or more grid blocks and a prototype block that includes a set of property values, wherein the one or more grid blocks include one or more block elements and a filter element, and wherein the set of property values of the prototype block are applied to a block element of the one or more block elements when the block element does not match the filter element; and data output from the computer code for analyzing performance characteristics of the constructed simulation model, thereby enabling determination of a desired form of the automotive propulsion system.

12. The non-transitory computer code of claim 11, wherein the second format comprises an XML format, thereby establishing a relational database for creation and analyzation of various selectable systems.

13. The non-transitory computer code of claim 12, wherein the XML format comprises a standardized format indicative of a plurality of components and a plurality of vehicle subsystems of the automotive propulsion system.

14. The non-transitory computer code of claim 11, wherein the automotive propulsion information indicative of the configuration of the system is stored in the first file, and wherein the automotive propulsion information indicative of the layout of the existing simulation model is stored in the second file.

15. The non-transitory computer code of claim 11, further comprising computer code for converting the automotive propulsion information from the second format to at least a portion of a third format, wherein the third format and the first format are substantially identical.

16. The non-transitory computer code of claim 11, wherein the computer code for capturing the automotive propulsion information includes a plurality of components selected from the group consisting of components for:
   parsing the plurality of subsystems;
   parsing one or more peripherals; and
   parsing one or more of connections, wherein the one or peripherals may comprise a parameter of the system, and wherein each of the one or more connections connects a first subsystem of the plurality of subsystems to a second subsystem of the plurality of subsystems.

17. The non-transitory computer code of claim 11, wherein the computer code for building the second simulation model includes a plurality of components selected from the group consisting of components for:
   expanding the plurality of subsystems;
   building the plurality of subsystems; and
   interconnecting the plurality of subsystems with the one or more connections.

* * * * *

UNITED STATES PATENT AND TRADEMARK OFFICE
CERTIFICATE OF CORRECTION

| | | |
|---|---|---|
| PATENT NO. | : 8,510,088 B2 | Page 1 of 1 |
| APPLICATION NO. | : 12/562866 | |
| DATED | : August 13, 2013 | |
| INVENTOR(S) | : Aymeric Rousseau et al. | |

It is certified that error appears in the above-identified patent and that said Letters Patent is hereby corrected as shown below:

On the Title Page:

The first or sole Notice should read --

Subject to any disclaimer, the term of this patent is extended or adjusted under 35 U.S.C. 154(b) by 756 days.

Signed and Sealed this
Tenth Day of March, 2015

Michelle K. Lee
*Deputy Director of the United States Patent and Trademark Office*